US008620084B2

(12) United States Patent
Kolmykov-Zotov et al.

(10) Patent No.: US 8,620,084 B2
(45) Date of Patent: Dec. 31, 2013

(54) SHAPE RECOGNITION USING PARTIAL SHAPES

(75) Inventors: Alexander Kolmykov-Zotov, Sammamish, WA (US); Sashi Raghupathy, Redmond, WA (US); Xin Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1172 days.

(21) Appl. No.: 12/147,175

(22) Filed: Jun. 26, 2008

(65) Prior Publication Data

US 2009/0324076 A1 Dec. 31, 2009

(51) Int. Cl.
*G06K 9/00* (2006.01)

(52) U.S. Cl.
USPC .............................. 382/187; 382/170; 382/156

(58) Field of Classification Search
USPC .......................................... 382/187, 170, 156
See application file for complete search history.

(56) References Cited

U.S. PATENT DOCUMENTS

| 4,561,105 | A  | 12/1985 | Crane et al. ................ | 382/185 |
| 5,636,297 | A  | 6/1997  | Eller et al. .................. | 382/293 |
| 6,208,360 | B1 | 3/2001  | Doi et al. .................... | 345/474 |
| 6,515,659 | B1 | 2/2003  | Kaye et al. .................. | 345/419 |
| 6,587,587 | B2 | 7/2003  | Altman et al. .............. | 382/181 |
| 6,747,643 | B2 | 6/2004  | Happel ........................ | 345/419 |
| 7,324,691 | B2 | 1/2008  | Li et al. ...................... | 382/181 |
| 2006/0126936 | A1 | 6/2006 | Bhaskarabhatla ............ | 382/187 |
| 2006/0274943 | A1* | 12/2006 | Abdulkader et al. ........ | 382/186 |
| 2007/0154094 | A1 | 7/2007 | Lin et al. ..................... | 382/187 |
| 2007/0217676 | A1 | 9/2007 | Grauman et al. ............ | 382/170 |

OTHER PUBLICATIONS

Xu et al: "An online composite graphics recognition approach based on matching of spatial relation graphs", IJDAR, 2004.*
Belongie et al: "Shape matching and object recognition using shape contexts", IEEE—PAMI, 2002.*
Di Mauro, et al.; Active Shape Model Search using Pairwise Geometric Histograms; pp. 1-11; http://64.233.183.104/search?q=cache:JnjO9MYz1TwJ:www.isbe.man.ac.uk/~bim/Papers/di_mauro_bmvc96.ps.gz+shape+segments+histogram+angles+distances&hl=en&ct=clnk&cd=1.
Xu, et al.; Sketch-based User Interface for Creative Tasks; 7 Pgs; http://www.cs.virginia.edu/~xj3a/research/publications/APCHI02.pdf.
Gear; Shape Recognition with the Tablet PC Platform InkAnalysis API; pp. 1-4; http://blogs.msdn.com/gavingear/archive/2007/01/24/shape-recognition-with-the-tablet-pc-platform-inkanalysis-api.aspx.

* cited by examiner

*Primary Examiner* — Ruiping Li
(74) *Attorney, Agent, or Firm* — Merchant & Gould

(57) ABSTRACT

Shape recognition is performed based on determining whether one or more ink strokes is not part of a shape or a partial shape. Ink strokes are divided into segments and the segments analyzed employing a relative angular distance histogram. The histogram analysis yields stable, incremental, and discriminating featurization results. Neural networks may also be employed along with the histogram analysis to determine complete shapes from partial shape entries and autocomplete suggestions provided to users for conversion of the shape into a known object.

20 Claims, 7 Drawing Sheets

SHAPE RECOGNITION USING PARTIAL SHAPES

BACKGROUND

As mobile devices are surpassing desktop computers in shipment growth and tablet features are becoming part of mainstream mobile computing, pen-based input is established as a core user experience. Parsing technologies analyze the structures within digital ink to enable advanced editing, searching and conversion features. These features are compelling reasons for pen-based mobile note-taking and tablet adoption.

Another popular feature of pen-based input systems is creating diagrams with pen and ink. Some conventional systems typically recognize ink entries automatically after each stroke by checking if the stroke is a shape, and if yes, converting to a corresponding shape object. The disadvantage of these systems is that many users prefer multi-strokes. Other systems perform recognition automatically on multi-strokes with timeout. The conversion to shape object happens after a timeout, at which point all previous strokes are considered as a single attempt of a shape. This approach presents another user related problem: time-outs are typically disliked because they reduce productivity, tend to be error prone and are not very reliable in detecting shape completion. Further systems employ a manual recognition method, where the conversion happens as initiated by the user, at which point all previous unconverted strokes are used. However, manual approaches are time consuming and user feedback is slower.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to shape recognition based on determining whether one or more strokes is not part of a shape or a partial shape. Ink strokes are divided into segments and the segments analyzed employing a relative angular distance histogram. The histogram analysis yields stable, incremental, and discriminating featurization results. According to some embodiments, neural networks may also be employed to determine complete shapes from partial shape entries and autocomplete suggestions provided to users for conversion of the shape into a known object.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, shape recognition may be performed based on determining whether one or more strokes is not part of a shape or a partial shape. Ink strokes may be divided into segments and the segments analyzed employing a relative angular distance histogram. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
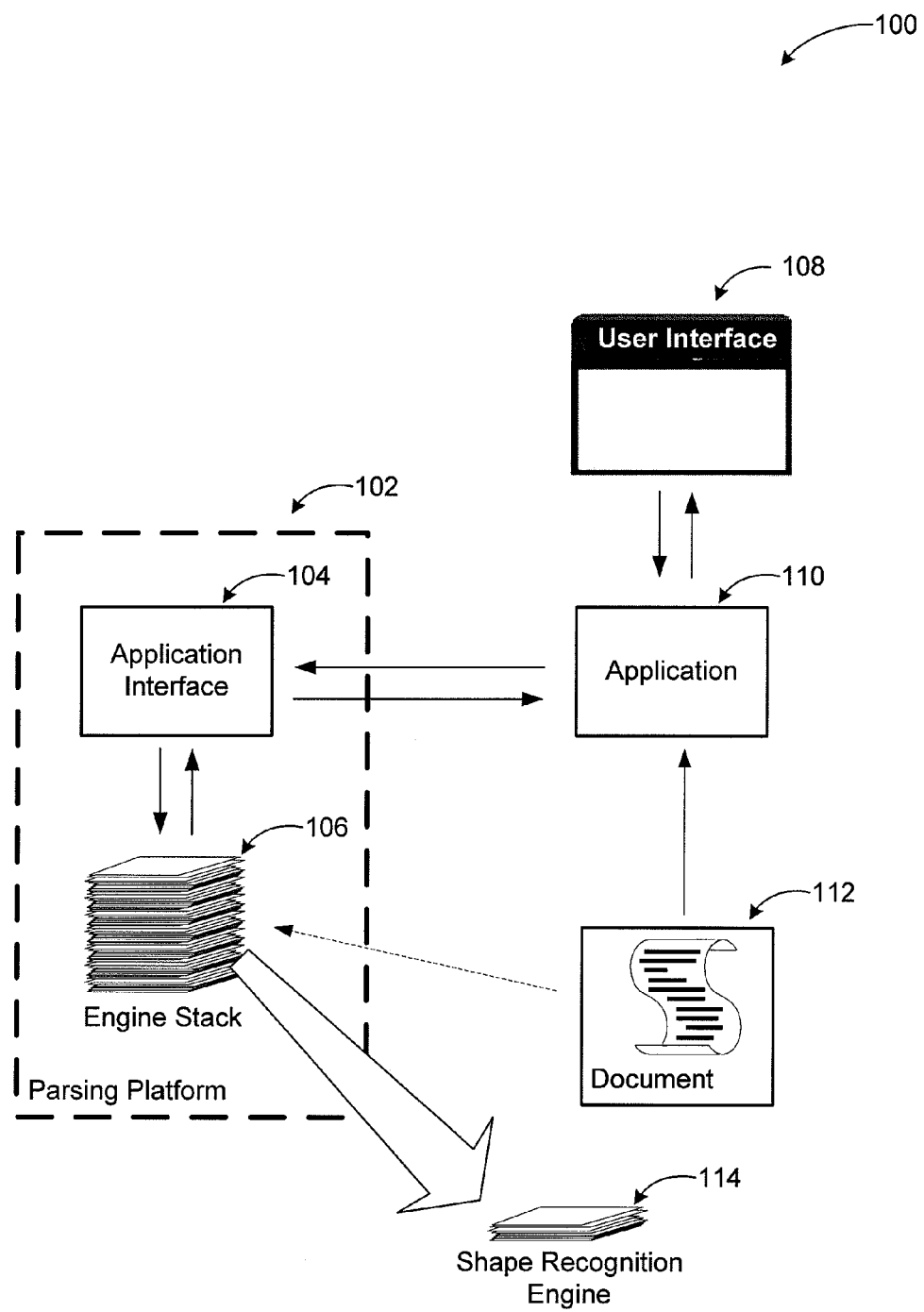
FIG. 1 is a conceptual diagram illustrating an ink recognition system with a parsing platform providing support for parsing engines in conjunction with shape recognition based on partial shapes.

Referring to FIG. 1, conceptual diagram 100 of an ink recognition system with a parsing platform providing support for shape recognition based on partial shapes is illustrated. Shape recognition based on partial shapes may be implemented as part of the engine stack or as a separate module within the parsing platform, or as part of the user application for ink entry.

A shape recognizer according to embodiments is able to differentiate not only shape types, but also whether the one or more ink entries are a partial shape (strokes that can be augmented to become a valid shape). Thus, the recognizer may detect following classes: 1) not a shape—the strokes cannot be augmented to become a valid shape—, 2) partial shape—the strokes can become a valid shape by adding one or more stroke to them—, 3) a special class for every shape type otherwise recognized—e.g. elliptical, triangular, rectangular, star, flag, heart, etc—. A machine learning technology may then be employed to combine the results of the featurization process in a stable manner.

The featurization may be accomplished using Relative Angular Distance (RAD) histograms. A shape is broken into a collection of small segments of ink, and the shape described as a histogram of angles and distances between pairs of these segments. The bins of the histogram then form the feature set. The way the feature sets are built, stability, incrementality, and discrimination characteristics typically sought in recognition are met.

The recognizer as described above may be used for an "autocomplete" feature allowing the user to input an incomplete shape and let the system complete it. Once the user gets used to the behavior, they can become a lot more productive drawing unambiguous prefixes of support shapes (shorthand's) instead of laying out the full shape.

In diagram 100 of FIG. 1, application 110 represents a user application for ink entry and other purposes such as word processing, presentation processing, spreadsheet processing, and the like. Application 110 may provide ink, document, or image information to parsing platform 102 and request parsed document in return. Application 110 may receive document 112 through user interface 108 or from another source. Parsing platform 102 works with application 110 and provides parsing services. Parsing platform 102 includes an engine stack 106 comprising various engines such as a writing/drawing classification engine for classifying ink strokes into writing and drawing, a line grouping engine for grouping writing strokes into line structure, and a block grouping engine for grouping writing lines into writing regions. Engine stack 106 also includes a shape recognition engine 114 to perform shape recognition as discussed above.

Embodiments described herein refer to applications and/or modules such as those discussed above, but they are not limited to specific applications. Any application or hosted service that performs shape recognition based on partial shapes may be implemented using the principles described herein. Such applications and/or modules may be implemented locally on a single computing device or in a distributed manner over a networked system such as a hosted parsing service.

Figure 2:
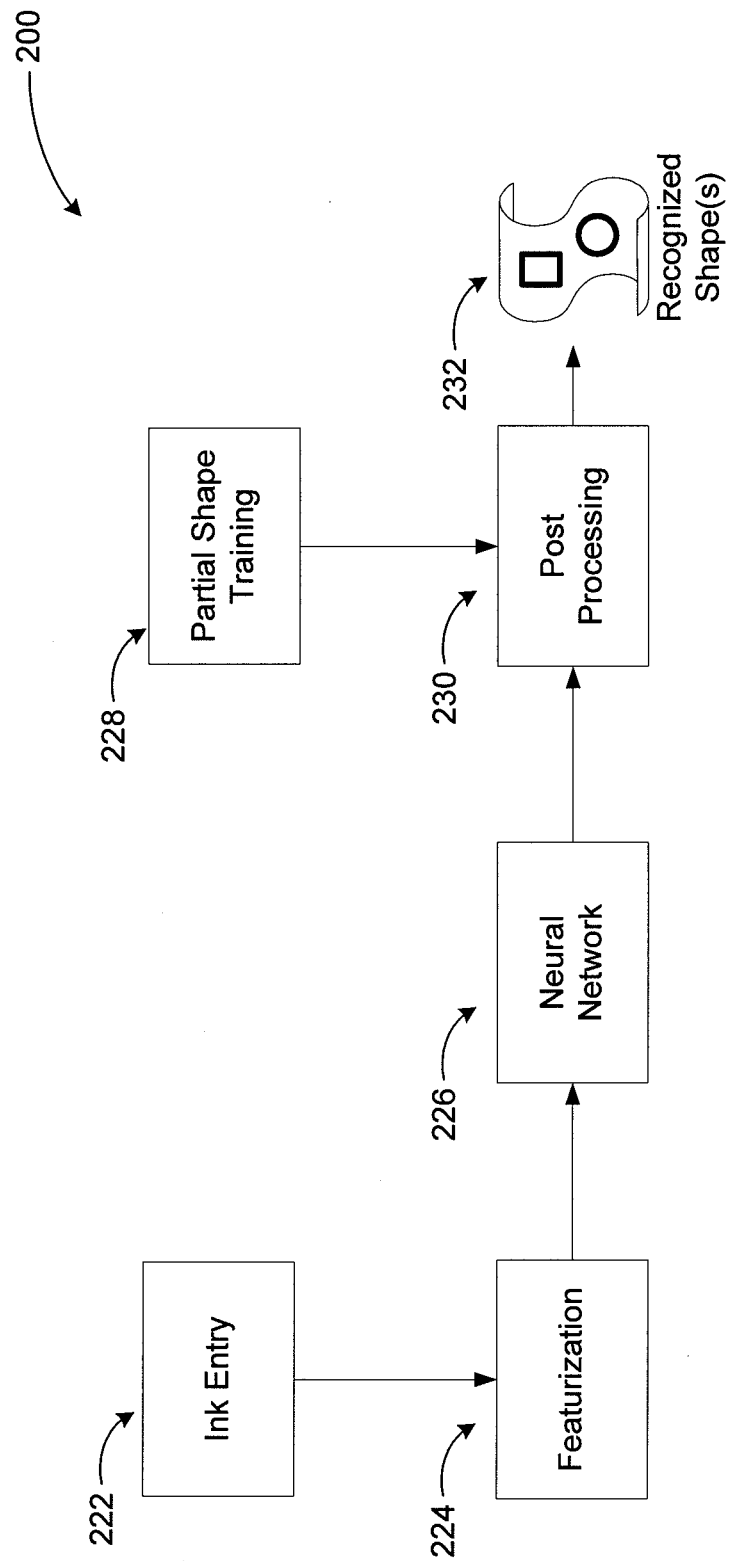
FIG. 2 illustrates major blocks in shape recognition using partial shapes.

FIG. 2 illustrates diagram 200 of major blocks in shape recognition based on partial shapes. Operations in a system according to embodiments begin with ink entry 222. The configuration shown in FIG. 2 is typical of conventional handwriting recognizers.

As shown in this example, hand drawn user input may be collected from an input device such as a touch pad in the form of electronic ink entry 222. The system may then perform featurization 224 on the ink. Featurization refers to extracting certain features from the ink data that may be useful to the recognition process. In a typical system, such features may include, for example, width, height, length (e.g., coordinate pair count and/or distance traveled in coordinate space, considered in two dimensions or computed separately in X and/or Y directions), maximum speed, count of direction reversals in the X and/or Y directions, detected cusps together with directionality and/or location (e.g., vertical position and/or horizontal position relative to the ink sample or to the writing area), detected ink crossings together with locations (in a similar manner as cusps), and/or Fourier transform frequency components in the X and/or Y directions. In a system according to embodiments, featurization may be performed employing RAD histograms as discussed previously and exemplified below.

Next, the features extracted during featurization 224 may be provided to a set of primary inputs of a neural network 226. Neural network 226 is conventionally known and may be trained to associate a particular combination of inputs to the primary inputs. It should be noted that network 226 may be a classifier other than a neural network. For example, network 226 may be a Bayesian network, a hidden Markov machine (HMM), a support vector machine (SVM), a template matcher, a dynamic time warping (DTW) unit, or any machine learning system.

Partial shape training 228 provides training to the shape recognition engine based on known partial and full shapes, and post-processing 230 includes any additional processing of recognized shapes such as auto-completion, and the like.

The blocks and operations discussed above are for exemplary purposes. Embodiments are not limited to the example blocks and may be implemented with fewer or more blocks and operations.

The user interface for a shape recognition application/module according to embodiments may start out in a state of "building a shape". As the user completes a stroke, the user interface may transition into one of the following states: (1) if the recognizer reports "partial shape": stay in the state "building a shape" state (displayed ink entries may be presented in a special way in this state); 2) if the recognizer reports "not a shape": reset and go back to "building a shape" state (optionally the displayed ink entry may be discarded at this point if the system only accepts valid shapes and does not allow free-form drawing); and 3) if the recognizer reports one of the recognized shape classes: convert to the shape object.

As described above, the partial shape approach may be used in several modes. For example, free-form drawings may be distinguished from recognizable shapes and allowed to be entered as such without an attempt to convert ink to known shapes. Partial shape approach may also be used in a way that allows the diagramming surface to be clean of anything but shapes. Finally, a smooth integration of text conversion into the diagramming surface may be enabled through recognition of shapes based on partial shapes.

It is not essential for a shape recognizer according to embodiments to differentiate which shape is being input when the ink entry is partial shape. The approach, however, enables a recognizer that can differentiate between partial shapes and report one of the following: (1) "ambiguous partial shape": the recognizer knows that the strokes are a partial shape, but it could become one of two or more shapes; (2) "unambiguous partial shape": the recognizer determines a unique shape and may report which shape it is (which shape it can be completed to); (3) "complete shape"; and (4) "not a shape".

The recognition of the partial shape assists in more accurately determining when the shape is complete indicating that the shape can be converted to a cleaned up shape and thereby partial shapes are not accidentally converted into cleaned up shapes. In addition, a shape recognizer as described above can also be used for an "auto-complete" feature allowing the user to put an incomplete shape and let the system complete it without having to wait for a timeout period to determine when to complete the incomplete shape. Once the user gets used to the behavior, they may become a lot more productive—they can draw "shorthand"/unambiguous prefixes of support shapes instead of laying out the full shape.

Figure 3:
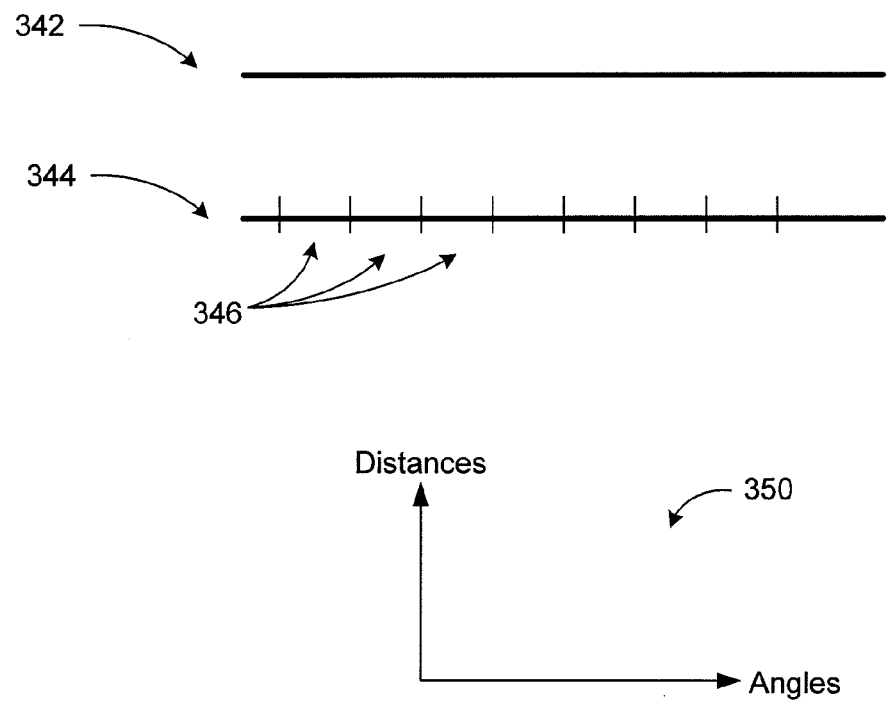
FIG. 3 illustrates an example approach to shape recognition using partial shapes according to one embodiment.
Figure 3:
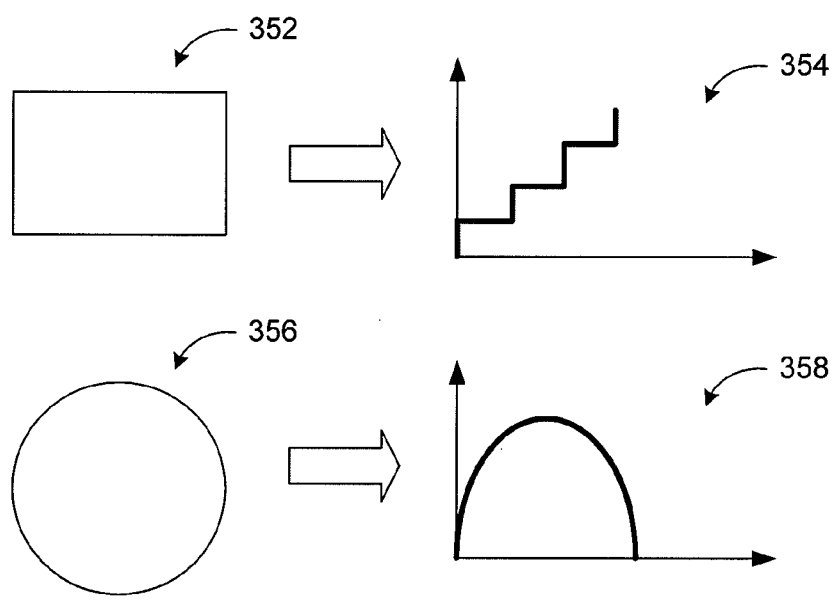

FIG. 3 illustrates an example approach to shape recognition using partial shapes according to one embodiment. As discussed previously, an ink entry 342 may be divided into arbitrary segments 346 as shown in ink entry 344. The angle and distance of segment pairs may then be analyzed forming a RAD histogram (350), which can reliably and stably predict the actual shape from the partial shape ink entry.

Thus, each known shape may be represented by its corresponding RAD histogram pattern such as pattern 354 for rectangle 352, pattern 358 for circle 356, and the like. This way, the actual shape may be predicted/recognized from the partial shape regardless of variations due to user entry or other factors.

Figure 4:
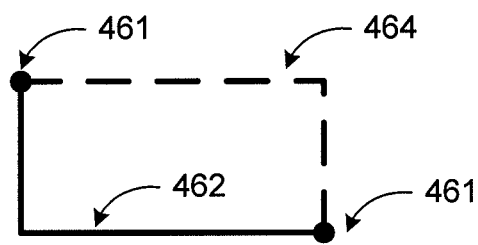
FIG. 4 illustrates example full proposed shapes based on user provided partial shapes.
Figure 4:
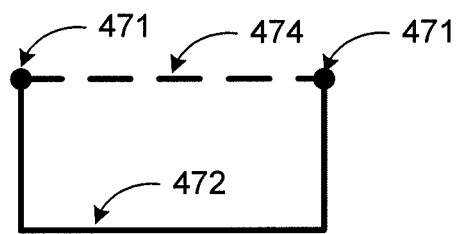
Figure 4:
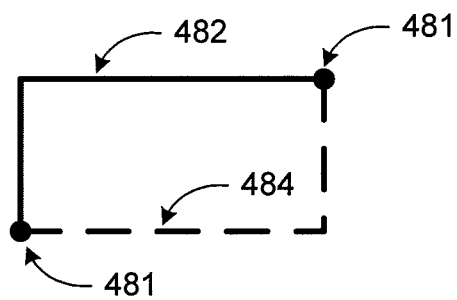

FIG. 4 illustrates example full proposed shapes based on user provided partial shapes. As mentioned above, the user interface for a shape recognition engine according to embodiments may be configured to provide auto-complete feature.

Once a shape is predicted/recognized from partial ink entry based on RAD histogram analysis and/or neural network processing, the rest of the shape may be presented to the user as a suggestion. For example, partial shape 462 with endpoints 461 may result in suggested completion 464. Similarly, partial shape 472 with endpoints 471 may be completed with suggested completion 474. Partial shape 482 with endpoints 481 may result in suggested completion 484.

The suggested completions may be displayed in many different ways for visual aid to the user such as different color, thickness, pattern, and the like. Additional user interface approaches may also be employed such as identifying the suggested completion using callouts, highlighting, and the like. Users may be enabled to accept or reject the suggested completion by selecting a control element, waiting out a time delay, or through another indication method. The auto-completion feature may also be turned on or off depending on user preferences.

Figure 5:
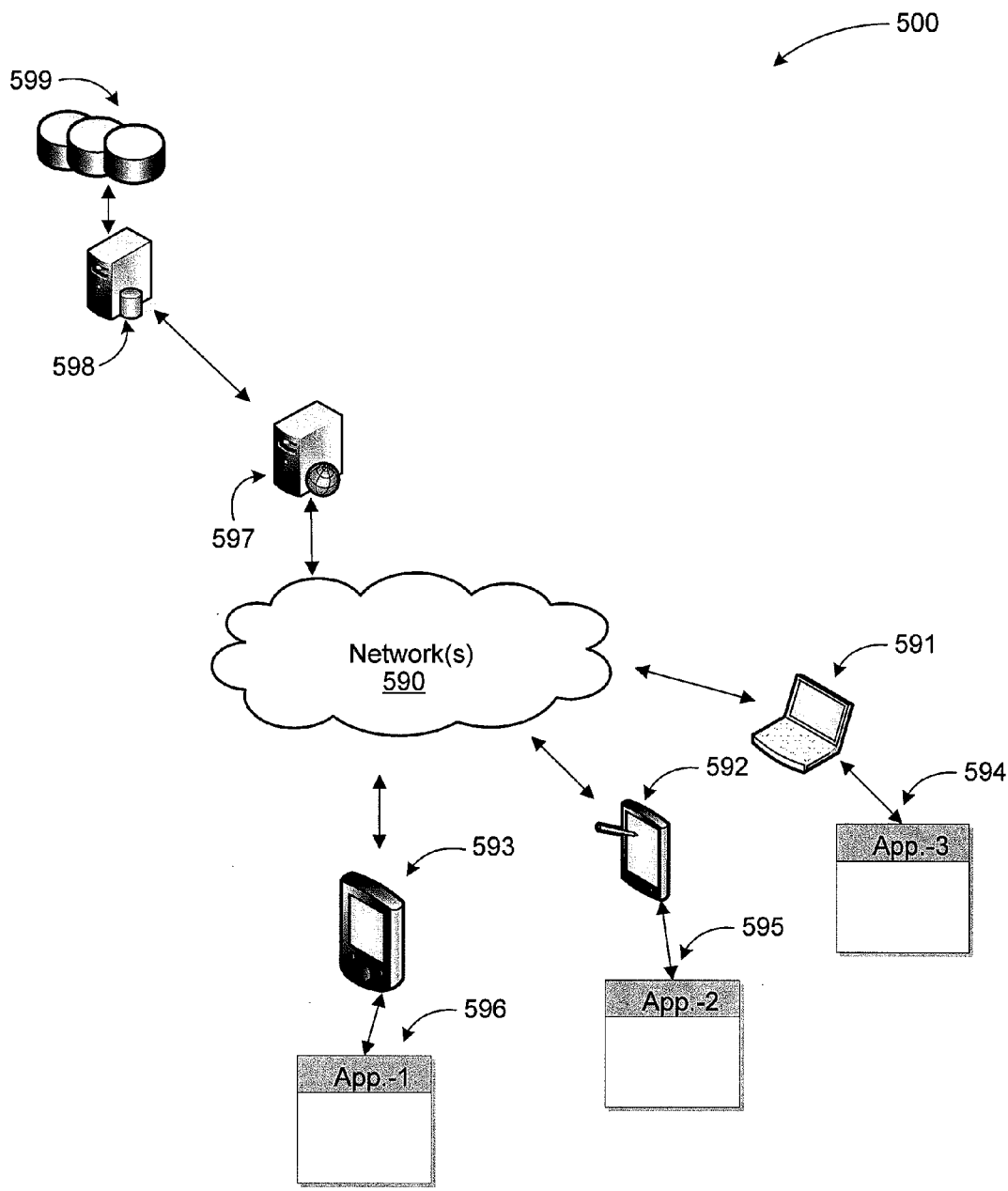
FIG. 5 is a networked environment where a shape recognition system based on partial shapes according to embodiments may be implemented.

FIG. 5 is an example networked environment, where embodiments may be implemented. While a shape recognition system based on partial shapes may commonly be implemented on individual computing devices as part of one or more applications, with increased use of distributed applications and networked systems, embodiments may also be realized in networked environments. Diagram 500 illustrates such an example environment. Server 597 may host a recognition service in conjunction with data stores 599, which may be managed by a database server 598. The service may receive input from various users through their client devices (client devices 591-593) and applications (594-596) executed on those devices through network(s) 590.

Upon receiving the initial ink entrie(s) and performing the parsing operations, the service may provide the parsed document(s) to the users with recognized shapes based on partial shape recognition and training. Such a system may be configured in a distributed manner over a number of physical and virtual clients and servers. It may also be implemented in un-clustered systems or clustered systems employing a number of nodes communicating over one or more networks (e.g. network(s) 590).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" as used in this portion may refer to a client application or a client device. While a networked system implementing shape recognition may involve many more components, relevant ones are discussed in conjunction with this figure.

Network(s) 590 may include a secure network such as an enterprise network, an unsecure network such as a wireless open network, or the Internet. Network(s) 590 provide communication between the nodes described herein. By way of example, and not limitation, network(s) 590 may include wired media such as a wired network or direct-wired connection, and wireless media such as acoustic, RF, infrared and other wireless media.

Many other configurations of computing devices, applications, data sources, data distribution systems may be employed to implement a shape recognition system according to embodiments. Furthermore, the networked environments discussed in FIG. 5 are for illustration purposes only. Embodiments are not limited to the example applications, modules, or processes.

Figure 6:
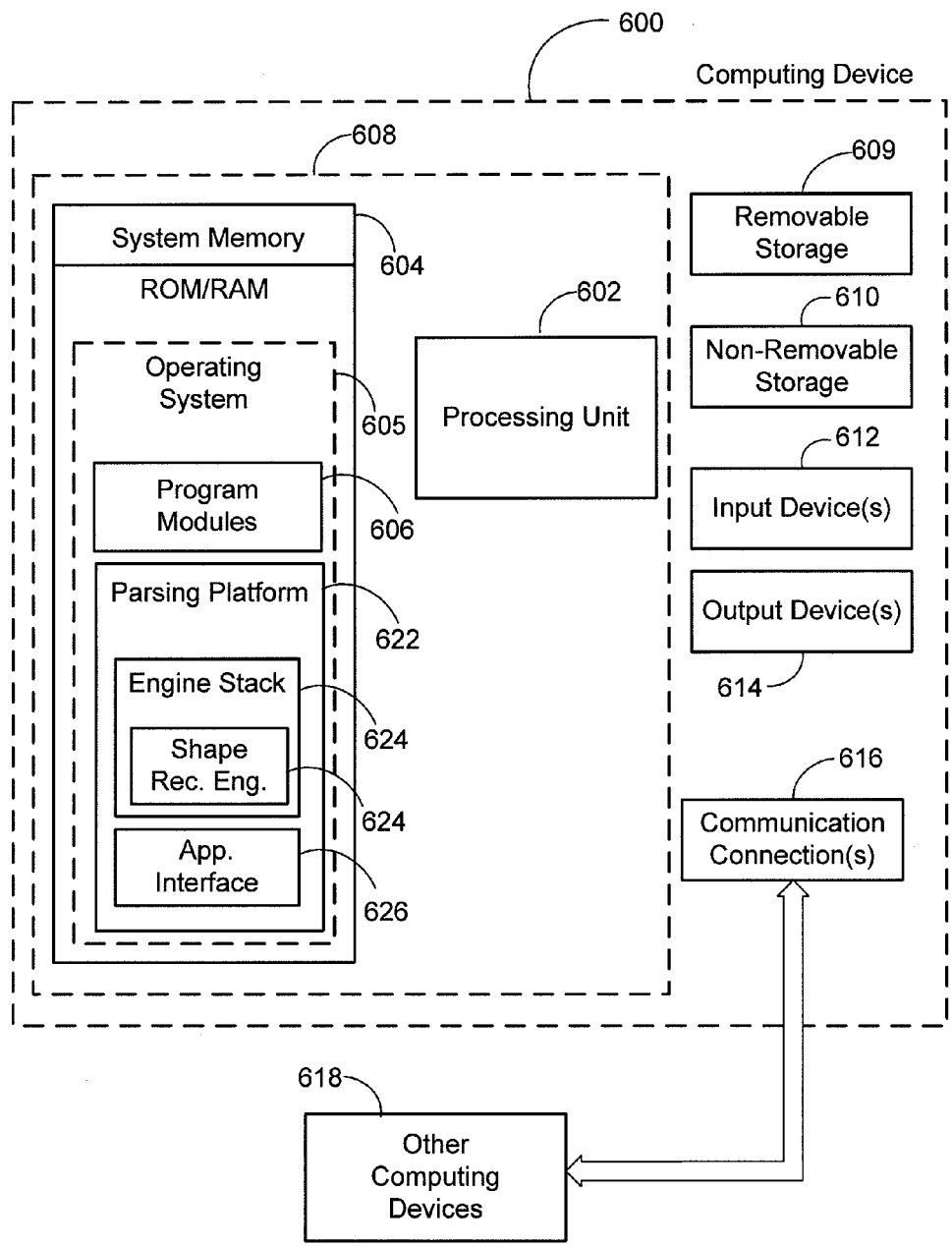
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a computer with ink entry capabilities. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of a networked personal computer, such as the WINDOWS® operating systems from MICROSOFT CORPORATION of Redmond, Wash. The system memory 604 may also include one or more software applications such as program modules 606, parsing platform 622, engine stack 624 with shape recognition engine 625, and application interface 626.

Parsing platform 622 performs parsing operations using its engine stack 624 including shape recognition engine 625 among other engines. Parsing platform also includes application interface 626. Shape recognition engine 625 may employ RAD histogram analysis and neural networks to recognize shapes (or free form drawings) from partial shape ink entrie(s). This basic configuration is illustrated in FIG. 6 by those components within dashed line 608. The functionality of parsing platform 622 does not have to be assigned to the distinct modules as described here. The above disclosed functionality may be performed by more or fewer modules or all by the same application (or service).

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609, and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include web servers, database servers, file servers, provider servers, and the like. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
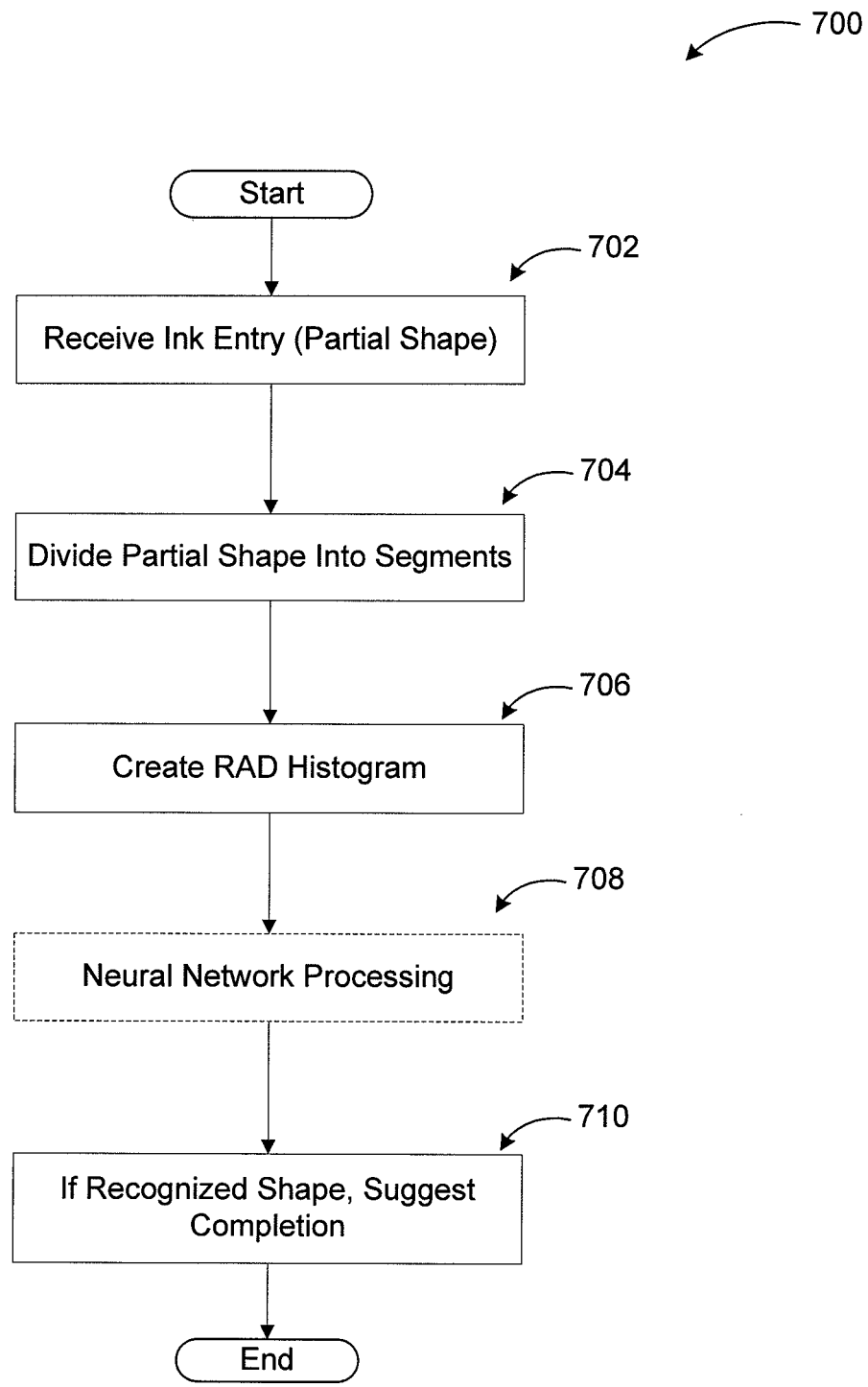
FIG. 7 illustrates a logic flow diagram of an example process of shape recognition based on partial shapes in a system according to embodiments.

FIG. 7 illustrates a logic flow diagram of example process 700 of shape recognition based on partial shapes in a system according to embodiments. Process 700 may be implemented in a computing device with ink entry capabilities.

Process 700 begins with operation 702, where one or more ink entries (partial shape) are received from a user in a recognition application. Processing continues to operation 704 from operation 702.

At operation 704, the partial shape (that may be created by one or more ink strokes) is divided into arbitrary segments. The length of the arbitrary segments may be predefined based on default parameters or adjustable depending on user preferences, system capabilities, and the like. While some shapes may be created using only one stroke, some shapes require more than one stroke to complete. Generally, more shapes can be expressed using multiple strokes. Additionally, some users may prefer to create shapes using multiple strokes instead of using single strokes.

Processing moves from operation 704 to operation 706, where a RAD histogram is generated by analyzing angles and distances of segment pairs. As discussed previously, the RAD histogram can reliably predict a shape through its unique pattern. Processing advances from operation 706 to optional operation 710.

At optional operation 710, a neural network may be employed in addition to the RAD histogram to recognize a known shape from the features of the partial shape. The system may be trained for the neural network process using partial and/or complete shapes. Processing moves from optional operation 710 to operation 712.

At operation 712, a suggested completion is provided to the user if the partial shape is recognized to be a part of a known shape. According to some embodiments, the system may not recognize the partial shape as part of a known shape and designate the ink entry as free form drawing allowing the user to continue free form drawing without attempting to convert the ink entrie(s) into shapes.

The operations included in process 700 are for illustration purposes. Shape recognition based on partial shapes may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for shape recognition, the method comprising:
    receiving ink entry comprising at least one stroke in a drawing mode;
    dividing the entire ink entry into segments that each have a predefined length;
    generating a Relative Angular Distance (RAD) histogram based on analyzing distances and angles of consecutive segment pairs;
    determining, based on a RAD histogram pattern, whether the ink entry is one of: an ambiguous partial shape, an unambiguous partial shape, a complete shape, and a non-shape; and
    upon determination that the ink entry is an unambiguous partial shape or a complete shape providing a suggested completion of the partial shape.

2. The method of claim 1, further comprising:
    employing a machine learning algorithm in addition to generating the RAD histogram to recognize a shape based on one of the ambiguous partial shape and the unambiguous partial shape.

3. The method of claim 2, wherein the machine learning algorithm includes at least one from a set of: a neural network, a Bayesian network, a hidden Markov machine (HMM), a support vector machine (SVM), a template matcher, and a dynamic time warping (DTW).

4. The method of claim 1, wherein a number and a size of the segments is fixed based on one of: a default value and a user preference.

5. The method of claim 1, wherein a number and a size of the segments is adjustable based on one of: a system parameter and a user preference.

6. The method of claim 1, further comprising:
    if the ink entry is determined to be a non-shape, enabling a user to continue entering freeform drawing entry without attempting to convert further ink entries into recognized shapes.

7. The method of claim 1, further comprising:
    if the ink entry is determined to be a non-shape, clearing the ink entry from a diagramming surface such that only recognizable shapes are displayed on the diagramming surface.

8. The method of claim 1, further comprising:
upon determination that the ink entry is an unambiguous partial shape or a complete shape either allowing automatic conversion to a cleaned up shape or presenting a suggested completion of the partial shape to a recognizable complete shape.

9. The method of claim 8, wherein the suggested completion is presented employing at least one from a set of: a coloring scheme, a pattern scheme, a line thickness scheme, a highlighting scheme, and a textual indication scheme.

10. The method of claim 8, further comprising:
enabling a user to one of: accept and reject the suggested completion based on at least one from a set of: selection of a control element and a timeout scheme.

11. The method of claim 8, further comprising:
enabling a user to create a shape by providing an ink entry constituting a shorthand for a recognizable complete shape.

12. A computing device arranged for shape recognition, the computing device comprising:
a user application with a user interface for accepting ink entries and displaying parsing results to a user;
a parsing platform that includes an engine stack with a shape recognition engine, wherein the shape recognition engine includes:
a featurization block for dividing an entire received ink entry into predefined length segments, generating a RAD histogram based on distances and angles of consecutive segment pairs, and determining whether the ink entry is one of: an ambiguous partial shape, an unambiguous partial shape, a complete shape, and a non-shape based on a RAD histogram pattern;
a machine learning block for determining a complete shape from one of: an ambiguous partial shape and an unambiguous partial shape; and
a post processing block that provides a suggested completion of a partial shape to a recognizable complete shape based on a result from the RAD histogram pattern analysis and the machine learning block determination.

13. The computing device of claim 12, wherein upon completion of an ink entry by a user the user interface is transitioned into one of:
if the ink entry is determined to be a partial shape, a continued building-a-shape state;
if the ink entry is determined to be a non-shape, a restarted building-a-shape state, where the ink entry is cleared from a diagramming surface of the user interface; and
if the ink entry is determine to be a complete shape converting the shape to an object.

14. The computing device of claim 13, wherein the shape recognition engine is further configured to categorize the ink entry determined to be a complete shape into a class comprising one of: an elliptical object, a triangular object, a rectangular object, a star-shaped object, a flag-shaped object, and a heart-shaped object.

15. The computing device of claim 13, wherein the parsing platform is further configured to enable integration of recognized textual data and any recognized shapes on the diagramming surface.

16. The computing device of claim 12, wherein the shape recognition engine further includes a partial shape training block comprising at least one of a default partial shape model and a user-defined partial shape model.

17. A computer-readable storage medium that is not a signal with instructions encoded thereon for shape recognition, the instructions comprising:
receiving ink entry in a handwriting recognition application set to a drawing mode;
dividing the ink entry into segments of a predefined length, wherein a number and a size of the segments is adjustable based on one of: a system parameter and a user preference;
generating a Relative Angular Distance (RAD) histogram based on analyzing distances and angles of consecutive segment pairs;
determining whether the ink entry is an unambiguous partial shape based on:
employing a machine learning algorithm in addition to generating the RAD histogram to recognize a shape based on one of the ambiguous partial shape and the unambiguous partial shape; and
analyzing a RAD histogram pattern;
if when the ink entry is determined to be an unambiguous partial shape, providing a suggested completion of the partial shape to a recognizable complete shape.

18. The computer-readable storage medium of claim 17, wherein the instructions further comprise:
presenting the suggested completion employing at least one from a set of: a coloring scheme, a pattern scheme, a line thickness scheme, a highlighting scheme, and a textual indication scheme; and
enabling a user to one of: accept and reject the suggested completion based on at least one from a set of: selection of a control element and a timeout scheme.

19. The computer-readable storage medium of claim 17, wherein the instructions further comprise:
if the ink entry is determined to be a non-shape, one of:
clearing the ink entry from a diagramming surface such that only recognizable shapes are displayed on the diagramming surface; and
enabling a user to continue entering freeform drawing entry without attempting to convert further ink entries into recognized shapes.

20. The computer-readable storage medium of claim 17, wherein the handwriting recognition application is integrated with at least one from a set of: a word processing application, a spreadsheet application, a presentation application, and a drawing application.

* * * * *